United States Patent
Taguchi et al.

(10) Patent No.: US 6,620,510 B1
(45) Date of Patent: Sep. 16, 2003

(54) EPOXY RESIN COMPOSITION, PREPREG, AND ROLL MADE OF RESIN REINFORCED WITH REINFORCING FIBERS

(75) Inventors: Masato Taguchi, Nagoya (JP); Hisao Koba, Tokyo (JP); Yutaka Yamaguchi, Toyohashi (JP)

(73) Assignee: Mitsubishi Rayon Co., Ltd., Tokyo (JP)

(*) Notice: Subject to any disclaimer, the term of this patent is extended or adjusted under 35 U.S.C. 154(b) by 0 days.

(21) Appl. No.: 09/869,127

(22) PCT Filed: Dec. 22, 1999

(86) PCT No.: PCT/JP99/07213

§ 371 (c)(1),
(2), (4) Date: Jun. 25, 2001

(87) PCT Pub. No.: WO00/39188

PCT Pub. Date: Jul. 6, 2000

(30) Foreign Application Priority Data

| Dec. 25, 1998 | (JP) | 10-370506 |
|---|---|---|
| Dec. 25, 1998 | (JP) | 10-370507 |
| May 17, 1999 | (JP) | 11-136441 |

(51) Int. Cl.[7] .......... B32B 27/38; B32B 27/04; B32B 1/08; B29D 23/00; C08L 63/00

(52) U.S. Cl. .......... 428/413; 428/34.1; 428/34.6; 428/34.7; 428/35.7; 428/35.9; 428/297.4; 428/300.7; 428/320.2; 523/400; 523/427; 523/428; 525/107

(58) Field of Search .......... 523/400, 427, 523/428; 525/107; 428/34.1, 34.6, 34.7, 35.7, 35.9, 297.4, 300.7, 320.2, 413, 414

(56) References Cited

U.S. PATENT DOCUMENTS

| 4,331,582 A | 5/1982 | Babayan |
| 5,268,223 A | 12/1993 | Qureshi et al. |
| RE35,081 E * | 11/1995 | Quigley .......... 428/36.2 |
| 5,567,506 A * | 10/1996 | Marshall et al. .......... 428/116 |
| 5,770,313 A * | 6/1998 | Furumoto et al. .......... 428/34.5 |
| 5,910,456 A * | 6/1999 | Matsuhisa et al. .......... 428/408 |
| 5,968,621 A * | 10/1999 | Okada .......... 428/36.3 |
| 6,045,898 A * | 4/2000 | Kishi et al. .......... 523/440 |
| 6,063,839 A * | 5/2000 | Oosedo et al. .......... 428/297.4 |
| 6,228,474 B1 * | 5/2001 | Kishi et al. .......... 428/297.4 |
| 6,273,830 B1 * | 8/2001 | Takemura et al. .......... 428/36.9 |
| 6,306,047 B1 * | 10/2001 | Kusumoto .......... 428/36.3 |
| 6,379,799 B1 * | 4/2002 | Almen .......... 428/297.4 |
| 6,399,199 B1 * | 6/2002 | Fujino et al. .......... 428/293.4 |
| 2001/0008163 A1 * | 7/2001 | Kimura et al. .......... 156/188 |

FOREIGN PATENT DOCUMENTS

| DE | 27 27 741 | 1/1979 |
| EP | 0 049 687 | 4/1982 |
| EP | 0 176 475 | 4/1986 |
| EP | 0 326 177 | 8/1989 |
| EP | 0 327 125 | 8/1989 |
| FR | 2 734 832 | 12/1996 |
| JP | 53-74599 | 7/1978 |
| JP | 55-17236 | 2/1980 |
| JP | 58-1718 | 1/1983 |
| JP | 58-83022 | 5/1983 |
| JP | 58-134126 | 8/1983 |
| JP | 58-206624 | 12/1983 |
| JP | 59-24718 | 2/1984 |
| JP | 59-24719 | 2/1984 |
| JP | 59-149922 | 8/1984 |
| JP | 59-217720 | 12/1984 |
| JP | 59-217722 | 12/1984 |
| JP | 60-6722 | 1/1985 |
| JP | 61-231021 | 10/1986 |
| JP | 61-250022 | 11/1986 |
| JP | 61-280931 | 12/1986 |
| JP | 62-141039 | 6/1987 |
| JP | 62-169829 | 7/1987 |
| JP | 62-241916 | 10/1987 |
| JP | 62-297312 | 12/1987 |
| JP | 62-297316 | 12/1987 |
| JP | 63-301221 | 12/1988 |
| JP | 63-305125 | 12/1988 |
| JP | 1-110524 | 4/1989 |
| JP | 2-3414 | 1/1990 |
| JP | 2-120314 | 5/1990 |
| JP | 2-124919 | 5/1990 |
| JP | 03-24119 * | 2/1991 .......... C08G/59/62 |
| JP | 3-227316 | 10/1991 |
| JP | 3-243619 | 10/1991 |
| JP | 4-337316 | 11/1992 |
| JP | 5-87123 | 4/1993 |
| JP | 5-172132 | 7/1993 |
| JP | 5-178960 | 7/1993 |
| JP | 5-28754 | 11/1993 |
| JP | 6-25445 | 2/1994 |
| JP | 6-58322 | 3/1994 |
| JP | 7-247338 | 9/1995 |

(List continued on next page.)

OTHER PUBLICATIONS

JP10–182793 (Abstract Only).

Primary Examiner—Robert Dawson
Assistant Examiner—Michael J Feely
(74) Attorney, Agent, or Firm—Oblon, Spivak, McClelland, Maier & Neustadt, P.C.

(57) ABSTRACT

An epoxy resin composition giving a cured resin plate which, after 60 hour standing at 150° C. and at the saturated vapor pressure, has a water absorption of 3.5% by weight or lower; a prepreg which comprises the epoxy resin composition and reinforcing fibers; and a fiber-reinforced resin roll which is 1) a laminate comprising fiber-reinforced resin layers each comprising reinforcing fibers and a matrix resin, wherein the matrix resin is a resin composition giving a cured resin plate which, after 60 hour standing at 150° C. and at the saturated vapor pressure, has a water absorption of 3.5% by weight or lower; or 2) a laminate comprising (i) at least one fiber-reinforced resin layer comprising long reinforcing fibers having an elastic modulus of 600~800 Gpa and a resin composition and (ii) at least one fiber-reinforced resin layer comprising long reinforcing fibers having an elastic modulus of 140~300 Gpa and a resin composition.

17 Claims, No Drawings

FOREIGN PATENT DOCUMENTS

| | | |
|---|---|---|
| JP | 7-329199 | 12/1995 |
| JP | 8-92350 | 4/1996 |
| JP | 9-137043 | 5/1997 |
| JP | 9-137044 | 5/1997 |
| JP | 10-182793 | 7/1998 |
| RU | 455132 | 3/1975 |
| RU | 781205 | 11/1980 |
| RU | 840073 | 6/1981 |

* cited by examiner

EPOXY RESIN COMPOSITION, PREPREG, AND ROLL MADE OF RESIN REINFORCED WITH REINFORCING FIBERS

TECHNICAL FIELD

The present invention relates to a prepreg, which is an intermediate material for providing a fiber-reinforced resin composite material such as roll of a resin reinforced with reinforcing fibers, and the like, and an epoxy resin composition suitable for use as a matrix resin for a prepreg.

In addition, the present invention relates to roll of a resin reinforced with reinforcing fibers which possesses an adequate rigidity; a roll of a resin reinforced with reinforcing fibers which exhibits superior humidity and heat resistance properties; and a roll of a resin reinforced with reinforcing fibers which exhibits an adequate rigidity in addition to superior humidity and heat resistance properties.

The present application is based on the corresponding Japanese Patent Applications (Japanese Patent Application, First Publication No. Hei 10-370506, Japanese Patent Application, First Publication No. Hei 10-370507, and Japanese Patent Application, First Publication No. Hei 11-136441), the disclosures of which are included as a part of the present specification.

BACKGROUND

Fiber-reinforced resin molded articles (FRP) comprising a reinforcing fiber of carbon fiber or the like, and matrix resins of epoxy resins and the like, enjoy wide use ranging from general purpose application, such as in fishing rods, golf club shafts, and the like, to the industrial and aerospace fields, due to their light weight and superior mechanical properties, e.g., rigidity, and the like. There exist several methods for molding these FRP molded articles. When using carbon fiber as a reinforcing fiber, a method which utilizes a so-called "prepreg", an intermediate material wherein a matrix resin is impregnated in advance into the reinforcing fiber, is most widely employed.

In order to satisfy the high speed requirement for printing machines, paper-making machines, paper processing machines, and the like, in recent years, such FRP molded articles having light weight and high rigidity have seen increasing use as a main material for rolls in such machines, which had been conventionally made of steel or aluminum. In particular, in an ink roll and/or nip roll of a rotary press for newspapers, and the like, FRP rolls coated with rubber are starting to be used.

For roll shells of a nip roll for a rotary press for newspapers, an adequate rigidity to resist the molding pressure during nipping is required. Deterioration in the rigidity of a roll shell affects the deflection of a nip roll. Increases in the deflection of a nip roll create difficulty in adjusting the nip width, due to the generation of wrinkles in the paper and deviations in the nip width. Thus, a steel roll shell has been used in the conventional nip roll. Accordingly, when using an PRP roll for a roll shell of a nip roll, it is necessary to provide a rigidity equivalent to that of a steel roll shell.

In addition, as a method for molding an FRP roll, the filament winding method is conventionally known. However, this method does not allow freedom with respect to the design if the rigidity equivalent to that of a steel roll shell is provided. Furthermore, rubber-coated rolls generally need replacement and re-vulcanization of the rubber when the life of the rubber comes to an end. Vulcanization of rubber is conducted under strict high-temperature and high-humidity conditions, and thus, the material used for this purpose needs to be superior with respect to its humidity and heat resistance properties.

However, FRP molded articles comprising a prepreg material that is generally used in sports equipment, which is cured at 130° C., does not exhibit a sufficient heat resistance. In addition, FRP molded articles comprising mainly multi-functional epoxy resins, which are used for imparting heat resistance, do not exhibit sufficient performance due to their high water absorption rate.

The properties of a matrix resin are affected largely by the composition of its resin composition. Recently, the epoxy resin composition that is most widely used as a prepreg matrix resin is cured at 130° C. and used mainly in sports equipment. This epoxy resin composition mainly comprises a bisphenol A epoxy resin, or a phenol novolak epoxy resin, which is then mixed with a curing agent.

This aforementioned epoxy resin composition exhibits superior, balanced properties with regard to the above-described properties; however, this resin composition cannot be used for purposes requiring a higher heat resistance, since the glass-transition temperature of the cured product obtained by curing the resin composition is usually 150° C. or lower.

On the other hand, the resin composition essentially comprising a multi-functional epoxy resin provides a cured product having a high heat resistance from the curing; however, this resin composition also exhibits unfavorable humidity and heat resistance properties, in general, due to a high moisture absorption rate. In addition, the resin composition comprising this multi-functional epoxy resin as a main component possesses unfavorable handling properties with respect to a prepreg obtained thereof, by means of impregnating the epoxy resin into a reinforcing fiber aggregate, due to strong tacking of the prepreg. Furthermore, the resin tends to flow easily while performing curing/molding of this prepreg, thus leading to an undesirable moldability of the prepreg.

Thus, a prepreg cured at 130° C., used when obtaining fiber-reinforced resin molded articles for general sports equipment, does not produce molded articles with sufficient heat resistance. In addition, the cured-molded articles from a prepreg essentially comprising a multi-functional epoxy resin composition, as a matrix resin, which is used for producing fiber-reinforced resin molded articles for their heat resistance properties, generally exhibit a high water absorption rate. In this manner, they pose problems with respect to humidity and heat resistance when used in a fiber-reinforced resin roll for the aforementioned purpose.

Accordingly, a first object of the present invention is to provide an epoxy resin composition, which can provide a cured product with superior humidity and heat resistance properties; an epoxy resin composition which can provide both a cured product with superior humidity and heat resistance properties, and a prepreg with adequate tacking properties, in addition to favorable handling and molding properties at the time of the curing/molding; and a prepreg which possesses adequate tacking properties, and favorable handling and molding properties at the time of the curing/molding.

In addition, a second object of the present invention is to provide a roll of a resin reinforced with reinforcing fibers that is resistant to the severe high temperature, high humidity conditions, e.g., under the vulcanizing conditions for forming a rubber-coated layer.

In addition, a third object of the present invention is to provide a roll of a resin reinforced with reinforcing fibers that possesses an equivalent rigidity to a steel roll.

Furthermore, the fourth object of the present invention is to provide a roll of a resin reinforced with reinforcing fibers that possesses a rigidity equivalent to that of a steel roll, i.e., resistant to the severe high temperature, high humidity conditions such as under the vulcanizing conditions for forming a rubber-coated layer.

DISCLOSURE OF THE INVENTION

In other words, the epoxy resin composition according to the present invention is characterized in satisfying the following condition (a).

(a) the water absorption rate of a cured resin board formed by means of curing said epoxy resin composition after sitting for 60 hours under a saturated vapor at 150° C. is no greater than 3.5% by weight.

Such an epoxy resin composition is able to exhibit superior humidity and heat resistance properties when cured.

In addition, the epoxy resin composition according to the present invention preferably satisfies the following condition (b).

(b) the ratio (LogG' after/ LogG' before) of the rigidity (LogG' after) at 150° C. of said cured resin board after sitting for 60 hours under a saturated vapor at 150° C. to the rigidity (LogG' before) at 150° C. of said cured resin board prior to sitting for 60 hours under a saturated vapor at 150° C. is not less than 0.95.

Such an epoxy resin composition is able to exhibit superior humidity and heat resistance properties when cured.

In addition, the epoxy resin composition according to the present invention preferably satisfies the following condition (c).

(c) the glass transition temperature of the cured resin board obtained by means of curing the epoxy resin composition is in the range of 150~200° C.

Such an epoxy resin composition is able to exhibit superior humidity and heat resistance properties when cured.

The epoxy resin composition according to the present invention preferably comprises:

a resin component (X) comprising 20~59% by weight of a bisphenol epoxy resin (A) which comprises an aqueous state at room temperature; 25~50% by weight of an epoxy resin (B) comprising at least one repeating unit selected from among the following formulae (formula 1~formula 4); a 15~40% by weight of an epoxy resin modified by means of crosslinked rubber granules having an average diameter of no greater than 1 m; and 1~10% by weight of a thermoplastic resin (D) that is soluble in a mixture of said epoxy resin (A) and epoxy resin (B); and a diamino diphenylsulfone (E) in the amount of 20~50 parts by weight to 100 parts by weight of said resin component (X);

wherein, the viscosity of said epoxy resin component at 60° C. is 500~3000 poise.

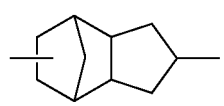

(formula 1)

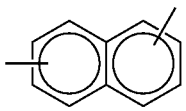

(formula 2)

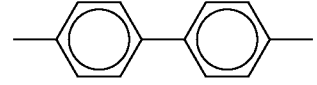

(formula 3)

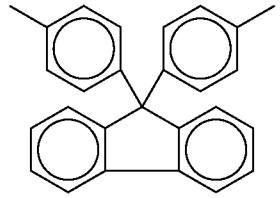

(formula 4)

By means of using this epoxy resin composition, it is possible to provide a cured product which exhibits superior humidity and heat resistance properties; and to provide a prepreg which possesses adequate tacking properties, and favorable handling and molding properties at the time of curing-molding.

In addition, the epoxy resin composition according to the present invention preferably contains 5~50 parts by weight of an epoxy resin (F) other than the aforementioned epoxy resin (B), the softening point of which is at least 70° C., per 100 parts by weight of the aforementioned resin component (X). Such an epoxy resin composition further improves the handling properties of a prepreg impregnated with reinforcing fibers.

In addition, the prepreg according to the present invention is characterized in comprising an epoxy resin composition according to the present invention and reinforcing fibers. Such a prepreg possesses adequate tacking properties, in addition to favorable handling and molding properties during curing-molding, and further exhibits superior humidity and heat resistance properties when molded.

In addition, a roll of a resin reinforced with reinforcing fiber is provided that is formed by means of laminating a plurality of resins reinforced with reinforcing fibers As comprising reinforcing fibers and matrix resin, wherein as said matrix resin, a resin composition satisfying the following condition (a) is employed:

(a) the water absorption rate of a cured resin board formed by means of curing said epoxy resin composition after sitting for 60 hours under a saturated vapor at 150° C. is no greater than 3.5% by weight.

Such a roll of a resin reinforced with reinforcing fibers is able to resist severe high temperature, high humidity conditions such as under the vulcanizing conditions for forming a rubber-coated layer.

In addition, the aforementioned resin composition preferably satisfies the following condition (b).

(b) the ratio (LogG' after/LogG' before) of the rigidity (LogG' after) at 150° C. of said cured resin board after sitting for 60 hours under a saturated vapor at 150° C. to the rigidity (LogG' before) at 150° C. of said cured resin board prior to sitting for 60 hours under a saturated vapor at 150° C. is not less than 0.95.

If the aforementioned resin composition satisfies the aforementioned condition (b), it is possible to provide a roll of a resin reinforced with reinforcing fibers that is able to resist severe high temperature, high humidity conditions such as under the vulcanizing conditions for forming a rubber-coated layer.

In addition, the aforementioned resin composition preferably satisfies the following condition (c).

(c) the glass transition temperature of the cured resin board obtained by means of curing the epoxy resin composition is in the range of 150~200° C.

If the aforementioned resin composition satisfies the aforementioned condition (c), it is possible to provide a roll of a resin reinforced with reinforcing fibers that is able to resist severe high temperature, high humidity conditions such as under the vulcanizing conditions for forming a rubber-coated layer.

In addition, the aforementioned resin composition is preferably an epoxy resin composition. If the aforementioned resin composition is an epoxy resin composition, it is easier to provide a product which exhibits a superior adhesiveness to a reinforcing fiber, superior handling properties with respect to the intermediate material e.g., prepreg, and superior mechanical and heat resistance properties with respect to the molded article. In particular, if the aforementioned resin composition is the epoxy resin composition according to the present invention, it is possible to exhibit superior humidity and heat resistance properties under conditions of high temperature and high humidity at the time of molding.

In addition, the aforementioned epoxy resin composition preferably comprises:

a resin component (X) comprising 20~59% by weight of a bisphenol epoxy resin (A) which comprises an aqueous state at room temperature; 25~50% by weight of an epoxy resin (B) comprising at least one repeating unit selected from among the following formulae above (formula 1~formula 4); (C) 15~40% by weight of an epoxy resin modified by means of crosslinked rubber granules having an average diameter of no greater than 1 m; and 1~10% by weight of a thermoplastic resin (D) that is soluble in a mixture of said epoxy resin (A) and epoxy resin (B); and a diamino diphenylsulfone (E) in the amount of 20~50 parts by weight to 100 parts by weight of said resin component (X);

wherein, the viscosity of said epoxy resin composition at 60° C. is 500~3000 poise.

By means of using such an epoxy resin composition, it is possible to provide a roll of a resin reinforced with reinforcing fibers that exhibits a superior resistance to both humidity and heat, wherein molding of the roll of a resin reinforced with reinforcing fibers is made easier, due to improved handling properties of the prepreg, which is obtained by means of impregnating the epoxy resin composition into reinforcing fibers.

In addition, the aforementioned epoxy resin composition preferably contains 5~50 parts by weight of an epoxy resin (F) other than the aforementioned epoxy resin (B), the softening point of which is at least 70° C., per 100 parts by weight of the aforementioned resin component (X). By means of using such an epoxy resin composition, it is possible to provide a roll of a resin reinforced with reinforcing fibers that is superior in humidity and heat resistance. In addition, it is easier to mold a roll of a resin reinforced with reinforcing fibers, due to improved handling properties of the prepreg, which is obtained by means of impregnating the epoxy resin composition into reinforcing fibers.

In addition, the roll of a resin reinforced with reinforcing fibers according to the present invention is obtained by means of laminating at least one layer (I) of a resin reinforced with reinforcing fibers comprising long reinforcing fibers having an elastic modulus of 600~800 GPa, and a resin composition; at least one layer (II) of a resin reinforced with reinforcing fibers comprising long reinforcing fibers having an elastic modulus of 140~300 GPa, and a resin composition for supporting said roll of a resin reinforced with reinforcing fibers in a circumferential direction; wherein, the weight ratio of said long reinforcing fibers having an elastic modulus of 600~800 GPa to said long reinforcing fibers having an elastic modulus of 140~300 Gpa is 2/3~4/1. Such a roll of a resin reinforced with reinforcing fibers possesses an equivalent rigidity to that of a steel roll.

The aforementioned resin composition preferably satisfies the aforementioned condition (a). If the aforementioned resin composition satisfies the aforementioned condition (a), it is possible to provide a roll of a resin reinforced with reinforcing fibers that is able to resist severe high temperature, high humidity conditions, such as under the vulcanizing conditions for forming a rubber-coated layer, which possesses an equivalent rigidity to a steel roll.

In addition, the aforementioned resin composition preferably satisfies the aforementioned condition (b). If the aforementioned resin composition satisfies the aforementioned condition (b), it is possible to provide a roll of a resin reinforced with reinforcing fibers possessing a rigidity equivalent to that of a steel roll, that is able to resist severe high temperature, high humidity conditions such as under the vulcanizing conditions for forming a rubber-coated layer.

In addition, the aforementioned resin composition preferably satisfies the aforementioned condition (c). If the aforementioned resin composition satisfies the aforementioned condition (c), it is possible to provide a roll of a resin reinforced with reinforcing fibers possessing a rigidity equivalent to that of a steel roll, that is able to resist severe high temperature, high humidity conditions such as under the vulcanizing conditions for forming a rubber-coated layer.

In addition, the aforementioned resin composition is preferably an epoxy resin composition. If the aforementioned resin composition is an epoxy resin composition, it is easier to provide a product that exhibits a superior adhesiveness to reinforcing fibers, superior handling properties with respect to an intermediate material, e.g., prepreg, and superior mechanical and heat resistance properties with respect to the molded article. In particular, if the aforementioned resin composition is the epoxy resin composition according to the present invention, it is possible to exhibit both superior humidity and heat resistance properties under the high temperature and high humidity conditions at the time of molding.

In addition, the aforementioned epoxy resin composition preferably comprises: a resin component (X) comprising 20~59% by weight of a bisphenol epoxy resin (A) which comprises an aqueous state at room temperature; 25~50% by weight of an epoxy resin (B) comprising at least one repeating unit selected from among the following formulae (formula 1~formula 4); (C) 15~40% by weight of an epoxy resin modified by means of crosslinked rubber granules having an average diameter of no greater than 1 m; and 1~10% by weight of a thermoplastic resin (D) that is soluble in a mixture of said epoxy resin (A) and epoxy resin (B); and a diamino diphenylsulfone (E) in the amount of 20~50 parts by weight to 100 parts by weight of said resin component (X); wherein, the viscosity of said epoxy resin composition at 60 C. is 500~3000 poise. By means of using such an epoxy resin composition, it is possible to provide a roll of a resin reinforced with reinforcing fibers that is superior in humidity and heat resistance, and it is easier to mold a roll of a resin reinforced with reinforcing fibers, due to the improved handling properties of the prepreg, which is obtained by means of impregnating the epoxy resin composition into reinforcing fibers.

In addition, the aforementioned epoxy resin composition preferably contains 5~50 parts by weight of (F) an epoxy resin other than the aforementioned epoxy resin (B), the softening point of which is 70° C., per 100 parts by weight of the aforementioned resin component (X). By means of using such an epoxy resin composition, it is possible to improve the handling properties of the prepreg, which is obtained by means of impregnating the epoxy resin composition into reinforcing fibers. Accordingly, it is easier to mold a roll of a resin reinforced with reinforcing fibers.

PREFERRED EMBODIMENT OF THE INVENTION

Epoxy Resin Composition

The epoxy resin composition according to the present invention satisfies the following condition (a).

(a) the water absorption rate of a cured resin board formed by means of curing said epoxy resin composition after sitting for 60 hours under a saturated vapor at 150° C. is no greater than 3.5% by weight.

An epoxy resin composition that satisfies the aforementioned condition (a) exhibits superior humidity and heat resistance properties when cured. The cured product of an epoxy composition, which does not satisfy the aforementioned condition (a), exhibits a deterioration in strength under severe high temperature, high humidity conditions, due to generation of cracking or the like.

Herein, the water absorption rate of the cured resin board obtained by means of curing an epoxy resin composition, which has been left for 60 hours at 150° C. under a saturated vapor (i.e., the water absorption rate of a cured resin board obtained by means of curing the epoxy resin composition after undergoing a humidity and heat resistance test) is measured in the following manner.

The epoxy resin composition is molded under the curing conditions of 180° C. for 3 hours, to yield a cured resin board having a thickness of 2 mm. This cured resin board is then cut into a test piece having a length of 60 mm and width of 12 mm. Subsequently, the humidity and heat resistance properties of the test piece are evaluated at 150° C. for 60 hours under a saturated vapor, to measure the water absorption rate (% by weight) of the test piece following this humidity and heat resistance test.

In addition, the epoxy resin composition according to the present invention preferably satisfies the following condition (b).

(b) the ratio (LogG' after/LogG' before) of the rigidity (LogG' after) at 150° C. of said cured resin board after sitting for 60 hours under a saturated vapor at 150° C. to the rigidity (LogG' before) at 150° C. of said cured resin board prior to sitting for 60 hours under a saturated vapor at 150° C. is not less than 0.95. The epoxy resin composition that satisfies the aforementioned condition (b) is able to exhibit superior humidity and heat resistance properties when cured.

Herein, the rigidity of the cured resin board, prior to sitting for 60 hours at 150° C. under a saturated vapor (Log G' before), can be measured in the following manner.

The epoxy resin composition is molded under the curing conditions of 180° C. for 3 hours, to yield a cured resin board having a thickness of 2 mm. This cured resin board is then cut into a test piece having a length of 60 mm and width of 12 mm. The temperature of this test piece is raised at a rate of 5° C./STEP, using a dynamic viscosity measurement device, while applying a shearing stress onto the test piece at a rate of 10 rad/second, to measure the temperature dependence of the storage rigidity of the test piece. The storage rigidity at 150° C. is defined as the rigidity of the cured resin board obtained by means of curing the epoxy resin composition at 150° C. (Log G' before).

In addition, the rigidity of the cured resin board obtained by means of curing the epoxy resin composition, which has been left for 60 hours at 150° C. under a saturated vapor (Log G' after), can be measured in the following manner.

The epoxy resin composition is molded under the curing conditions of 180° C. for 3 hours, to yield a cured resin board having a thickness of 2 mm. This cured resin board is then cut into a test piece having a length of 60 mm and width of 12 mm. Subsequently, the humidity and heat resistance properties of the test piece are evaluated at 150° C. for 60 hours under a saturated vapor. After performing the humidity and heat resistance test, the temperature dependence of the storage rigidity of the test piece is measured using a dynamic viscosity measurement device. The storage rigidity at 150° C. is defined as the rigidity of the cured resin board obtained by means of curing the epoxy resin composition at 150° C. (Log G' after).

In addition, the epoxy resin composition according to the present invention preferably satisfies the following condition (c).

(c) the glass transition temperature of the cured resin board obtained by means of curing the epoxy resin composition is in the range of 150~200° C.

The epoxy resin composition that satisfies the aforementioned condition (c) is able to exhibit superior humidity and heat resistance properties when cured.

Herein, the glass transition temperature of the cured resin board obtained by means of curing the epoxy resin composition can be measured in the following manner.

The epoxy resin composition is molded under the curing conditions of 180° C. for 3 hours, to yield a cured resin board having a thickness of 2 mm. This cured resin board is then cut into a test piece having a length of 60 mm and width of 12 mm. The temperature of this test piece is raised at a rate of 5° C./STEP, using a dynamic viscosity measurement device, while applying a shearing stress onto the test piece at a rate of 10 rad/second, to measure the temperature dependence of the storage rigidity of the test piece. The glass transition temperature is defined at the intersection of the tangent line of the temperature dependence curve of the storage rigidity in the region in which it comprises a glass state, and the tangent line of the same in the region in which it comprises a transition state.

The epoxy resin composition according to the present invention may also comprise an epoxy resin composition comprising:

a resin component (X) comprising 20~59% by weight of a bisphenol epoxy resin (A) which comprises an aqueous state at room temperature; 25~50% by weight of an epoxy resin (B) comprising at least one repeating unit selected from among the following formulae (formula 1~formula 4); (C) 15~40% by weight of an epoxy resin modified by means of crosslinked rubber granules having an average diameter of no greater than 1 m; and 1~10% by weight of a thermoplastic resin (D) that is soluble in a mixture of said epoxy resin (A) and epoxy resin (B); and a diamino diphenylsulfone (E) in the amount of 20~50 parts by weight to 100 parts by weight of said resin component (X);

wherein, the viscosity of said epoxy resin composition at 60° C. is 500~3000 poise.

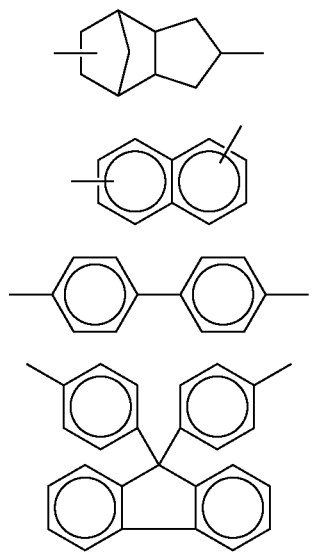

(formula 1)

(formula 2)

(formula 3)

(formula 4)

In addition, the epoxy resin composition according to the present invention may further comprise an epoxy resin composition that contains 5~50 parts by weight of an epoxy resin (F) other than the aforementioned epoxy resin (B), the softening point of which is 70° C., per 100 parts by weight of the aforementioned resin component (X).

Examples of the aforementioned bisphenol epoxy resin (A) having an aqueous state at room temperature (hereinafter, referred to as the component (A)), may include bisphenol A epoxy resin, bisphenol F epoxy resin, bisphenol S epoxy resin, and the like. These epoxy resins may be used alone or in combinations of two or more types.

The component (A) is mixed in the amount of 20~59% by weight in the aforementioned resin component (X). A mixing amount of less than 20% by weight of the component (A) leads to an excessively high viscosity of the epoxy resin composition, resulting in insufficient impregnation of the epoxy resin composition when forming a prepreg, manifesting as a lack of tacks. In addition, the prepreg becomes overly stiff, and does not result in the desired properties after molding. On the other hand, a mixing amount exceeding 59% by weight leads undesirably to an epoxy resin composition having a low viscosity, which results in excessive tacking and excessive resin flows during molding. These are undesirable properties at the time of molding.

In addition, the component (A) preferably possesses an epoxide equivalent weight no greater than 200 (g/eq). An epoxide equivalent weight no greater than 200 (g/eq) results in maintenance of the viscosity of the epoxy resin composition at an adequate level required for the matrix resin for use in forming the prepreg, and also favorably allows for the dissolution of the epoxy resin modified with cross-linked rubber granules (C).

The aforementioned epoxy resin (B) (hereinafter, referred to as the component (B)), contains repeating units of at least one skeleton selected from among a dicyclopentadiene skeleton, naphthalene skeleton, biphenyl skeleton, and fluorene skeleton, represented by the aforementioned formulae (1)~(4).

An epoxy resin composition into which the aforementioned component (B) containing a rigid skeleton is incorporated, is able to provide a molded article exhibiting a superior heat resistance, without dramatically increasing the crosslinking density at the time of curing. Thus, by means of blending the component (B) into the epoxy resin composition, it is possible to provide a cured-molded article exhibiting a small residual stress. In addition, by means of reducing the moisture absorption site, it is possible to provide a cured-molded article with an improved moisture resistance.

The component (B) is mixed into the aforementioned resin component (X) in an amount of 25~50% by weight. A mixing amount of less than 25% by weight of the component (B) makes it difficult to provide a cured-molded article with a superior heat resistance, without dramatically increasing the crosslinking density. A mixing amount exceeding 50% by weight of the component (B) leads undesirably to deterioration in both the curability of the epoxy resin composition, and in the toughness of the cured-molded article.

Among the component (B), examples of the epoxy resin containing repeating units represented by the aforementioned formula (1), i.e., dicyclopentadiene skeleton, may include commercially available products such as HP7200 manufactured by Dai-Nippon Ink and Chemical Industries, Inc., EX1257 manufactured by Toto Kasei K.K., and the like.

Among the component (B), examples of the epoxy resin containing repeating units represented by the aforementioned formula (2), i.e., naphthalene skeleton, may include commercially available products such as HP4032 manufactured by Dai-Nippon Ink and Chemical Industries, Inc., and the like.

Among the component (B), examples of the epoxy resin containing repeating units represented by the aforementioned formula (3), i.e., biphenyl skeleton, may include commercially available products such as YX4000H, and YL6121H manufactured by Yuka Shell Epoxy K.K., and the like.

Among the component (B), examples of the epoxy resin containing repeating units represented by the aforementioned formula (4), i.e., fluorene skeleton, may include commercially available products such as ESF-300 manufactured by Nippon Steel Chemical Co., Ltd., HPT 1079 manufactured by Yuka Shell Epoxy K.K., and the like.

The aforementioned epoxy resin modified using cross-linked rubber granules (C) (hereinafter, referred to as the component (C)), is an epoxy resin modified using cross-linked rubber granules having an average granular diameter of no greater than 1.0 μm. This resin functions to control the effects of the residual stress on the epoxy resin composition. Accordingly, by means of mixing the component (C) into the epoxy resin composition, it is possible to provide a cured-molded article exhibiting a small residual stress. In addition, by means of reducing the moisture absorption site, it is possible to provide a cured-molded article with an improved moisture resistance.

In addition, as the component (C), the epoxy resin modified with cross-linked rubber granules which have been cross-linked in advance, imparts a sufficient heat resistance to the cured-molded article obtained by means of curing the epoxy resin composition comprising thereof On the other hand, the rubber granules of a non-crosslinked liquid rubber, such as butadiene—acrylonitrile rubber (CTBN) containing a carboxylic terminal group, provide neither sufficient controlling effects on the residual stress imparted to the epoxy resin composition, nor sufficient heat resistance to the cured-molded article obtained by means of curing the epoxy resin composition comprising thereof 15~40% by weight of the component (C) is mixed into the aforementioned resin component (X). A mixing amount of less than 15% by weight of the component (C) does not provide sufficient controlling effects on the residual stress of the epoxy resin composition. On the other hand, a mixing amount exceeding 40% by weight of the component (C) leads to an epoxy resin composition with a high viscosity, and hence to a deterioration in the handling properties of the prepreg obtained by impregnating thereof Furthermore, the rigidity and heat resistance of the roll of a resin reinforced with reinforcing fibers obtained by means of curing-molding thereof deteriorates as well.

If the average granular diameter of the crosslinked rubber granules used in the component (C) exceeds 1.0 $\mu$m, the crosslinked rubber granules penetrate between the reinforcing fibers, at the time of curing-molding the prepreg to provide a cured-molded article, thus making it difficult to provide a uniformly cured-molded article. Accordingly, as the component (C), an epoxy resin modified with crosslinked rubber granules having an average granular diameter of 1.0 $\mu$m or smaller, or preferably 0.5 $\mu$m or smaller, is used.

Examples of the component (C) may include commercially available products of resin compositions in which crosslinked rubber granules with an average granular diameter of 1.0 $\mu$m or smaller, are mixed into a bisphenol epoxy resin and partially reacted, e.g., BPA 328 (manufactured by Nippon Catalyst K.K.), BPF 307 (manufactured by Nippon Catalyst K.K.), BPA 601 (manufactured by Nippon Catalyst K.K.), a crosslinked NBR-modified epoxy resin referred to as "XER-91P" (manufactured by Nippon Synthetic Rubber Co., Ltd.), and the like.

The aforementioned thermoplastic resin (D) (hereinafter, referred to as the component (D)), is a thermoplastic resin that is soluble in a mixture of the component (A) and component (B). Examples of the component (D) may include a polyvinyl formal, phenoxy resin, polyvinyl butyral, polyamide, polyether sulfone, polyether imide, and the like. Among the aforementioned, polyvinyl formal and phenoxy resin are preferred. The component (D) may be used alone, or in combinations of two or more types.

The component (D) is mixed into the aforementioned resin component (X) in an amount of 1~10% by weight, or preferably 2~6% by weight. A mixing amount of less than 1% by weight of the component (D) leads to excessively strong tacking of the prepreg obtained by means of impregnating the epoxy resin composition, and excessive resin flows during molding, thus resulting in undesirable properties when molded. A mixing amount exceeding 10% by weight of the component (D) leads undesirably to an epoxy resin composition of a high viscosity, and thus to deterioration in the handling properties of the prepreg obtained by means of impregnating thereof The aforementioned epoxy resin (F) (i.e., epoxy resin other than the epoxy resin (B), hereinafter, referred to as the component (F)), the softening point of which is 70° C., functions to control the fluidity epoxy resin composition without sacrificing the low-temperature curability thereof Thus, this component (F) leads to favorable handling properties of the epoxy resin composition at room temperature.

A component (F) having a softening point less than 70° C. does not provide adequate handling properties at room temperature with regard to the epoxy resin composition.

Examples of the aforementioned component (F) may include a bisphenol A epoxy resin, bisphenol F epoxy resin, bisphenol S epoxy resin, phenol novolak epoxy resin, isocyanate-modified bisphenol A epoxy resin, and the like. The component (F) may be used alone, or in combinations of two or more types.

The component (F) is preferably mixed in an amount of 5~50 parts by weight per 100 parts by weight of the aforementioned resin component (X). A mixing amount of less than 5 parts by weight of the component (F) leads to deterioration in the handling properties of the epoxy resin composition at room temperature, in addition to excessive tacking of the prepreg obtained by means of impregnating the resin composition. This in turn results in excessive resin flows during molding, and undesirable properties following molding. A mixing amount exceeding 50 parts by weight of the component (F) leads to an excessively stiff epoxy resin composition, insufficient impregnation of the prepreg obtained by means of impregnating the resin composition, lack of tacks, and a stiff prepreg, thus resulting in undesirable properties upon molding.

The component (F) preferably possesses an epoxide equivalent weight (g/eq) of 200~10000, and more preferably 250~700, from the perspective of the curability of the entire epoxy resin composition.

The aforementioned diaminodiphenylsulfone (E) (hereinafter, referred to as the component (E)) is a curing agent.

The component (E) is mixed in amount of 20~50 parts by weight per 100 parts by weight of the aforementioned resin component (X). Thereby, it is easier to obtain an epoxy resin composition that satisfies the aforementioned condition (c).

In addition, the viscosity of the epoxy resin composition according to the present invention at 60° C. is preferably 500~3000 poise. A viscosity at 60° C. of less than 500 poise leads to excessively strong tacking and excessive resin flows during curing-molding of the prepreg obtained by means of impregnating the resin composition into reinforcing fibers. This in turn results in difficulty in producing a cured-molded article possessing favorable properties. On the other hand, a viscosity at 60° C. exceeding 3000 poise leads to deterioration in the ability to impregnate the resin composition into reinforcing fibers at the time of forming the prepreg, thus making it to difficult to provide a prepreg in which the epoxy resin composition is uniformly impregnated.

Herein, the viscosity of the epoxy resin composition refers to a rheometer viscosity, which is measured under the conditions of an atmospheric temperature of 60° C. at a shear speed of 10 rad/second after filling the prepared epoxy resin composition between the two disk plates having a diameter of 25 mm (at an interval distance of 0.5 mm) of the dynamic viscosity measuring device.

(Prepreg)

The prepreg according to the present invention is obtained by means of impregnating the aforementioned epoxy resin composition into reinforcing fibers. The form and arrangement of the prepreg according to the present invention are not particularly limited, as long as the prepreg comprises the aforementioned epoxy resin composition and reinforcing fibers. Examples of the prepreg according to the present invention may include various forms such as a uniaxially oriented long fiber, woven cloth, tow, mat, knit, and sleeve.

The material of the aforementioned reinforcing fiber, and the like, are not particularly limited. Examples of the reinforcing fiber may include carbon fiber, glass fiber, aramid fiber, boron fiber, steel fiber, and the like. Among the aforementioned, carbon fiber is preferably used due to its favorable mechanical properties when molded. Both polyacrylonitrile (PAN) carbon fiber and pitch carbon fiber may be used as the carbon fiber.

(Roll of a Resin Reinforced With Reinforcing Fibers)

The roll of a resin reinforced with reinforcing fibers according to the present invention is obtained by means of laminating a plurality of layers of resins reinforced with reinforcing fibers comprising reinforcing fibers and matrix resin, and comprises the resin composition that satisfies the following condition (a) as the aforementioned matrix resin.

(a) the water absorption rate of a cured resin board formed by means of curing said epoxy resin composition after sitting for 60 hours under a saturated vapor at 150° C. is no greater than 3.5% by weight.

The material of the aforementioned reinforcing fiber, and the like, are not particularly limited. Examples of the reinforcing fiber may include carbon fiber, glass fiber, aramid fiber, boron fiber, steel fiber, and the like. Among the aforementioned, carbon fiber is preferably used due to its favorable mechanical properties when molded. Both polyacrylonitrile (PAN) carbon fiber and pitch carbon fiber may be used as the carbon fiber.

The resin composition used as the matrix resin in the roll of a resin reinforced with reinforcing fibers according to the present invention may comprise any resin composition satisfying the aforementioned condition (a), and is not particularly limited. If the aforementioned resin composition satisfies the aforementioned condition (a), a deterioration of the quality of the resultant roll of a resin reinforced with reinforcing fibers does not occur even if repeatedly exposed to high temperature and high humidity conditions. Such a resin composition hence exhibits sufficient resistant to severe high temperature, high humidity conditions, such as under the vulcanizing conditions for forming a rubber-coated layer.

When using a resin composition that does not satisfy the aforementioned condition (a), i.e., a resin composition wherein the water absorption rate of a cured resin board formed by means of curing said epoxy resin composition after sitting for 60 hours under a saturated vapor at 150° C. exceeds 3.5% by weight, the resultant roll of a resin reinforced with reinforcing fibers tends to have a lower strength due to cracks generated within the roll shell under severe high temperature, high humidity conditions, such as under the vulcanizing conditions.

In addition, the aforementioned resin composition preferably satisfies the following condition (b).

(b) the ratio (LogG' after/LogG' before) of the rigidity (LogG' after) at 150° C. of said cured resin board after sitting for 60 hours under a saturated vapor at 150° C. to the rigidity (LogG' before) at 150° C. of said cured resin board prior to sitting for 60 hours under a saturated vapor at 150° C. is not less than 0.95.

If the resin composition satisfies the aforementioned condition (b), a deterioration in the quality of the resultant roll of a resin reinforced with reinforcing fibers does occur even if repeatedly exposed to high temperature and high humidity conditions. Such a roll of a resin reinforced with reinforcing fibers is thus sufficiently resistant to severe high temperature, high humidity conditions such as under the vulcanizing conditions for forming a rubber-coated layer.

In addition, the aforementioned resin composition preferably satisfies the following condition (c).

(c) the glass transition temperature of the cured resin board obtained by means of curing the epoxy resin composition is in the range of 150~200° C.

If the resin composition satisfies the aforementioned condition (c), the resultant roll of resin reinforced with reinforcing fibers is sufficiently resistant to the severe high temperature, high humidity conditions, such as under the vulcanizing conditions for forming a rubber-coated layer.

As the aforementioned resin composition, an epoxy resin composition is preferred due to its superior adhesiveness to the reinforcing fibers, superior handling properties with respect to the intermediate material, e.g., prepreg, and superior mechanical properties, heat resistance, and the like when molded.

In addition, examples of the epoxy resin composition may include an epoxy resin composition that comprises:

a resin component (X) comprising 20~59% by weight of the component (A); 25~50% by weight of the component (B); 15~40% by weight of the component (C); and 1~10% by weight of the component (D); and the component (E) in the amount of 20~50 parts by weight to 100 parts by weight of said resin component (X); wherein, the viscosity of said epoxy resin composition at 60° C. is 500~3000 poise. By means of using such an epoxy resin composition, it is possible to provide a roll of a resin reinforced with reinforcing fibers that exhibits superior humidity and heat resistance properties, wherein the handling properties of the prepreg obtained by means of impregnating the epoxy resin composition in the reinforcing fiber are favorable, making it easier to mold the roll of a resin reinforced with reinforcing fibers.

In addition, further examples of the aforementioned epoxy resin composition may include an epoxy resin composition containing 5~50 parts by weight of the aforementioned component (F) per 100 parts by weight of the aforementioned resin component (X). Use of such an epoxy resin composition results in favorable handling properties of the prepreg, obtained by means of impregnating the epoxy resin composition in the reinforcing fiber, making it easier to mold the roll of a resin reinforced with reinforcing fibers.

The roll of a resin reinforced with reinforcing fibers according to the present invention is manufactured by means of forming a prepreg by impregnating the aforementioned resin composition in the aforementioned reinforcing fiber; laminating these prepregs; and curing-molding.

The form and arrangement of the prepreg used in the roll of a resin reinforced with reinforcing fibers according to the present invention are not particularly limited as long as the prepreg comprises the aforementioned reinforcing fibers and resin composition. Examples may include various forms such as uniaxially oriented long fibers, woven cloth, tow, mat, knit, and sleeve.

The roll of a resin reinforced with reinforcing fibers according to the present invention can be manufactured by means of, for example, winding a mandrel with a predetermined number of sheets of the aforementioned prepreg or laminated prepreg, entirely or partially from the inside, if necessary, such that an angle layer and straight layer are combined; followed by thermal and pressure molding. The thickness of the prepreg, carbon fiber areal weight, the content ratio of the resin, and the like, are not particularly limited, and may be appropriately selected by considering the thickness required for each layer, and winding diameter.

Examples of the method for curing-molding the prepreg may include compression molding using a metal mold, and the like, autoclave molding, vacuum bag molding, tape wrapping molding, and the like.

Other examples of the roll of a resin reinforced with reinforcing fibers according to the present invention may include a roll that is obtained by means of laminating at least one layer (I) of a resin reinforced with reinforcing fibers comprising long reinforcing fibers having an elastic modulus of 600~800 GPa, and a resin composition; at least one layer (II) of a resin reinforced with reinforcing fibers comprising long reinforcing fibers having an elastic modulus of 140~300 GPa, and a resin composition for supporting said roll of a resin reinforced with reinforcing fibers in a circumferential direction.

The aforementioned layer (I) comprising long reinforcing fibers having an elastic modulus of 600~800 GPa (hereinafter, referred to as the layer (I) of the resin reinforced with reinforcing fibers), is a layer of a resin reinforced with reinforcing fibers in order to provide a rigidity equivalent to that of a steel roll shell.

On the other hand, the aforementioned layer (II) of a resin reinforced with reinforcing fibers comprising long reinforcing fibers having an elastic modulus of 140~300 GPa (hereinafter, referred to as the layer (II) of the resin reinforced with reinforcing fibers), is a layer of a resin reinforced with reinforcing fibers in order to improve the pressing strength of the roll of a resin reinforced with reinforcing fibers, and to prevent cracking during vulcanization of the rubber.

In addition, the layer (II) of the resin reinforced with reinforcing fibers is preferably used at or near the outermost layer of the roll of a resin reinforced with reinforcing fibers as an overlap for abrasion. By means of using the layer (II) of the resin reinforced with reinforcing fibers as an overlap for abrasion, it is possible to minimize the deterioration of the rigidity of the roll of the resin reinforced with reinforcing fibers from surface abrasion when molding the roll or replacing the rubber, compared to when using the layer (I) of the resin reinforced with reinforcing fibers as the overlap for abrasion.

The range required to provide a light-weight roll comprising an equivalent rigidity to that of a steel roll shell is described in the following.

The mixing ratio of the aforementioned long reinforcing fiber having an elastic modulus of 600~800 GPa to the aforementioned long reinforcing fiber having an elastic modulus of 140~300 GPa, needs to be in the range of 2/3~4/1 by weight. A weight ratio of less than 2/3 leads to an inadequate amount of the long reinforcing fibers having an elastic modulus of 600~800 GPa, such that a roll of a resin reinforced with reinforcing fibers possessing a rigidity equivalent to that of a steel shell roll is not achieved. A weight ratio exceeding 4/1 leads to an inadequate amount of long reinforcing fibers having an elastic modulus of 140~300 GPa, resulting in a roll of a resin reinforced with reinforcing fibers with an inferior pressing strength, which in turn, tends to generate cracking during vulcanization.

The reinforcing fiber according to the present invention may be any long reinforcing fiber as long as its elastic modulus is in the range of 600~800 GPa, or 140~300 GPa; the material and the like, are not particularly limited. Examples of the aforementioned reinforcing fiber may include carbon fiber, glass fiber, aramid fiber, boron fiber, steel fiber, and the like. Among the aforementioned, carbon fiber is preferably used due to its favorable mechanical properties when molded. Both polyacrylonitrile (PAN) carbon fiber and pitch carbon fiber can be used as the carbon fiber.

The resin composition used as the matrix resin in the layer of the resin reinforced with reinforcing fibers according to the present invention preferably satisfies the aforementioned condition (a). If the aforementioned resin composition satisfies the aforementioned condition (a), the resultant roll of the resin reinforced with reinforcing fibers does not deteriorate in quality even when repeatedly exposed to conditions of high temperature and high humidity. In other words, this roll of the resin reinforced with reinforcing fibers exhibits sufficient resistance to severe high temperature, high humidity conditions such as under the vulcanizing conditions for forming a rubber-coated layer.

In addition, the aforementioned resin composition preferably satisfies the aforementioned condition (b). If the resin composition satisfies the aforementioned condition (b), the resultant roll of the resin reinforced with reinforcing fibers does not deteriorate in quality even when repeatedly exposed to conditions of high temperature and high humidity. In other words, this roll of the resin reinforced with reinforcing fibers exhibits sufficient resistance to severe high temperature, high humidity conditions such as under the vulcanizing conditions for forming a rubber-coated layer.

In addition, the aforementioned resin composition preferably satisfies the aforementioned condition (c).

If the resin composition satisfies the aforementioned condition (c), the resultant fiber-reinforced and resin-reinforced exhibits sufficient resistance to severe high temperature, high humidity conditions such as under the vulcanizing conditions for forming a rubber-coated layer.

As the aforementioned resin composition, an epoxy resin composition is preferred due to its superior adhesiveness to the reinforcing fibers, superior handling properties of the intermediate material such as prepreg, and the like, and superior properties when molded.

In addition, examples of the epoxy resin composition may include an epoxy resin composition that comprises: a resin component (X) comprising 20~59% by weight of the aforementioned component (A); 25~50% by weight of the aforementioned component (B); 15~40% by weight of the aforementioned component (C); and 1~10% by weight of the aforementioned component (D); and the aforementioned component (E) in the amount of 20~50 parts by weight to 100 parts by weight of said resin component (X); wherein, the viscosity of said epoxy resin composition at 60° C. is 500~3000 poise. By means of using such an epoxy resin composition, it is possible to provide a roll of a resin reinforced with reinforcing fibers which exhibits a superior rigidity in addition to superior humidity and heat resistance properties, wherein favorable handling properties of the prepreg are obtained by means of impregnating the epoxy resin composition into the reinforcing fibers, which in turn facilitate molding of the roll of the resin reinforced with reinforcing fibers.

In addition, examples of the aforementioned epoxy resin composition may further include an epoxy resin composition that comprises 5~50 parts by weight of the aforementioned component (F) to 100 parts by weight of the aforementioned resin component (X). Use of such an epoxy resin composition results in favorable handling properties of the prepreg obtained by means of impregnating the epoxy resin composition into the reinforcing fibers, which in turn facilitate molding of the roll of the resin reinforced with reinforcing fibers.

The roll of the resin reinforced with reinforcing fibers according to the present invention is manufactured by means of forming two types of prepregs by means of impregnating the aforementioned resin composition into two types of the long reinforcing fibers, followed by lamination of these prepregs, and curing-molding.

The roll of the resin reinforced with reinforcing fibers according to the present invention is particularly suitable for a rotary press for newspapers; however, the aforementioned is not particularly limited thereto, and may be applied to various tubular products.

EXAMPLES

In the following, the roll of the resin reinforced with reinforcing fibers, epoxy resin composition, and prepreg according to the present invention are described in detail, using examples.

Component (A)

EP 828: Epikote 828, a bisphenol A epoxy resin manufactured by Yuka Shell Epoxy K.K. (Epoxide equivalent weight: 184~194. Liquid at room temperature).

EP 807: Epikote 807, a bisphenol F epoxy resin manufactured by Yuka Shell Epoxy K.K. (Epoxide equivalent weight: 160~170. Liquid at room temperature).

Component (B)

HP 7200: A dicyclopentadiene epoxy resin, manufactured by Dai-Nippon Ink and Chemical Industries, Inc. (Epoxide equivalent weight: 264. Solid at room temperature).

Component (C)

BPF 307: A reaction product comprising crosslinked acryl rubber granules with an average granular diameter of 0.3 $\mu$m, and a bisphenol F epoxy resin, manufactured by Nippon Catalyst K.K. The estimated content amount of the crosslinked rubber is 20% by weight.

XER 91P: A reaction product comprising crosslinked butadiene-type rubber granules with an average granular diameter of 0.3 $\mu$m, and a bisphenol A epoxy resin, manufactured by Nippon Synthetic Rubber Co., Ltd. The estimated content amount of the crosslinked rubber is 20% by weight.

Component (D)

PVF: Vinylek E, a polyvinylformyl resin, manufactured by Chisso Corp.

DDS: A diaminodiphenylsulfone.

DICY: Epicure DICY7, a dicyandiamide, manufactured by Yuka Shell Epoxy K.K. (Molecular weight: 84)

DCMU: DCMU-99, dichlorodimethylurea, manufactured by Hodogaya Chemical Co., Ltd. (Molecular weight: 233)

Component (F)

EP 1002: Epikote 1002, a bisphenol A epoxy resin, manufactured by Yuka Shell Epoxy K.K. (Epoxide equivalent weight: 600~700. Solid at room temperature. Softening point: 78° C.).

N 775: EPICLON N775, a phenol novolak epoxy resin, manufactured by Dai-Nippon Ink and Chemical Industry Inc. (Softening point: 70~80° C.).

XAC 4151: An oxazolidone ring-containing epoxy resin, manufactured by Asahi Chiba K.K. (Epoxide equivalent weight: 412. Solid at room temperature. Softening point: 104° C.).

Measurement of the Rheometer Viscosity

The rheometer viscosity was measured under the conditions of an atmospheric temperature of 60° C. and a shearing speed of 10 radian/second after filling the prepared epoxy resin composition between two disk plates having a diameter of 25 mm (at an interval distance of 0.5 mm) of RDA-700, a dynamic viscosity measuring device manufactured by Rheometric Far East Corp.

Measurement of the Water Absorption Rate

An epoxy resin composition was molded under the curing conditions of 180° C. for 3 hours, to yield a cured resin board having a thickness of 2 mm. This cured resin board was subsequently cut into a test piece having a length of 60 mm and width of 12 mm. The humidity and heat resistance test was performed on this test piece at 150° C. for 60 hours under a saturated vapor, using PC-305RS, a pressure cooker testing device manufactured by Hirayama Seisakusho, to measure the water absorption rate (% by weight) of the test piece after the humidity and heat resistance test.

Measurement of the Maintenance Rate of the Rigidity

The epoxy resin composition was molded under the curing conditions of 180° C. for 3 hours, to yield a cured resin board having a thickness of 2 mm. This cured resin board was cut into a test piece having a length of 60 mm and width of 12 mm. The temperature of this test piece was raised at a rate of 5° C./STEP, using RDA-700, a dynamic viscosity measurement device manufactured by Rheometric Far East Corp, while shearing stress was applied to the test piece at a rate of 10 radian/second, to measure the temperature dependence of the storage rigidity of the test piece. The storage rigidity at 150° C. was defined as the rigidity of the cured resin board obtained by means of curing the epoxy resin composition at 150° C. (Log G' before).

Subsequently, the aforementioned cured resin board was cut into a test piece of a length of 60 mm and width of 12 mm. The humidity and heat resistance test was performed on this test piece at 150° C. for 60 hours under a saturated vapor, using PC-305RS, a pressure cooker testing device manufactured by Hirayama Seisakusho. The temperature dependence of the storage rigidity of the test piece was then measured using RDA-700, a dynamic viscosity measurement device manufactured by Rheometric Far East Corp. The storage rigidity at 150° C. was defined as the rigidity of the cured resin board obtained by means of curing the epoxy resin composition at 150° C. (Log G' after).

The aforementioned ratio of Log G' before and Log G' after (Log G' after/Log G' before), multiplied by 100, was defined as the maintenance rate of the rigidity.

Measurement of Glass Transition Temperature

The epoxy resin composition was molded under the curing condition of 180° C. for 3 hours, to yield a cured resin board having a thickness of 2 mm. This cured resin board was cut into a test piece having a length of 60 mm and width of 12 mm. The temperature of this test piece is raised at a rate of 5° C./STEP, using RDA-700, a dynamic viscosity measurement device manufactured by Rheometric Far East Corp, while applying shearing stress onto the test piece at a rate of 10 radian/second, to measure the temperature dependence of the storage rigidity of the test piece. The intersection of the tangent of the temperature dependence curve of the storage rigidity in the area of the glass state, and the tangent in the area of the transition state, was defined as the glass transition temperature.

Measurement of Deflection of the Roll of a Resin Reinforced With Reinforcing Fibers Under the following conditions, a weight was placed on the roll of the resin reinforced with reinforcing fibers, to measure the extent of deflection at the center, by means of performing a three-point bending test.

Conditions: Span of 1600 mm between the supports, span of 200 mm between the weights, and weight of 1471 N.

Handling Properties Test of the Prepreg

After the prepared epoxy resin composition was coated on a mold releasing paper to form a resin film, the film was laid on top of a reinforcing fiber aggregate comprising uniaxially oriented carbon fibers (TR30S-12L, manufactured by Mitsubishi Rayon Co., Ltd.), and thermally treated under pressure, to mold uniaxially oriented prepreg with a resin content of 33% by weight and carbon fiber areal weight of 150 g/m$^2$, impregnated with a matrix resin comprising the aforementioned epoxy resin composition. The prepreg was manually evaluated using a function test to assess the handling properties according to the following standard.

○: Both tacking and flexibility were favorable, and winding of the prepreg onto the mandrel was performed with extreme ease.

Δ: Due to lack of flexibility, some difficulty was encountered on winding the prepreg onto the mandrel.

×: Tacking was extremely strong, and great difficulty was encountered in winding the prepreg onto the mandrel.

Bending Test of the Epoxy Resin Cured Product

The epoxy resin composition was molded under the curing conditions of 180° C. for 3 hours, to yield a cured resin board having a thickness of 2 mm. This cured resin board was cut into a test piece of a length of 60 mm and width of 12 mm. A three-point bending test was performed on the test piece under the following conditions, using TENSILON, manufactured by Orientec, to measure the bending strength, elastic modulus, and ductility.

Conditions: Measuring condition of L/D (distance between the supports/thickness)=16 mm, indenter terminal radius=3.2 mm, and cross head speed =2 mm/min.

Example 1

(1) Preparation of the Epoxy Resin Composition (Matrix Resin)

A uniform mixture of 15 parts by weight of EP828 (component (A)), 37 parts by weight of HP7200 (component (B)), 3 parts by weight of PVF (component (D)), and 37 parts by weight of XAC 4151 (component (F)), was added to a uniform mixture of 20 parts by weight of EP 807 (component (A)), 25 parts by weight of BPF 307 (component (C)), and 35 parts by weight of DDS (component (E)), and kneaded to yield an epoxy resin composition with a rheometer viscosity of 1880 poise at 60° C.

The water absorption rate of the cured resin board obtained by means of curing this epoxy resin composition after performing a humidity and heat resistance test was 3.3% by weight, and the maintenance rate of the rigidity (%) thereof at 150° C. was 97.6%. The glass transition temperature of the cured resin board obtained by means of curing the epoxy resin composition was 166° C.

(2) Preparation of the Prepreg

The aforementioned epoxy resin composition was coated onto a mold releasing paper, using a roll coater to form a resin film. Subsequently, a resin film was laid on top of a uniaxially-oriented carbon fiber, thermally treated under pressure, followed by impregnation of the carbon fiber using the epoxy resin composition to form the following prepreg.

Prepreg (I): Carbon fiber areal weight was 175 g/m$^2$. K13710 (a pitch-type carbon fiber manufactured by Mitsubishi Chemical Corp., having an elastic modulus of 653 GPa) was used as the carbon fiber. The resin content amount was 33% by weight.

Prepreg (II): Carbon fiber areal weight was 125 g/m$^2$. TR30S12L (a PAN-type carbon fiber manufactured by Mitsubishi Rayon Co., Ltd., having an elastic modulus of 235 GPa) was used as the carbon fiber. The resin content amount was 25% by weight.

(3) Preparation of the Roll of the Resin Reinforced With Reinforcing Fibers

The aforementioned prepregs (I) and (II) were successively wound onto a straight mandrel with an outer circumference of 80 mm and length of 2100 mm, according to the following processes (i)–(iv).

(i) The prepreg (II) was cut to create four layers when the prepreg (II) was wound onto the mandrel such that the fiber direction was 90° with respect to the centerline of the mandrel. This prepreg was wound onto the mandrel to form a 90° reinforced layer.

(ii) The prepreg (I) was cut to create eleven layers when the prepreg (I) was wound onto the 90° reinforced layer, such that the fiber direction was 0° with respect to the centerline of the mandrel. This prepreg was wound onto the 90° reinforced layer to form a first straight layer.

(iii) The aforementioned winding processes (i) and (ii) were further repeated twice, to obtain a laminated member comprising a total of 45 layers of wound prepreg layers.

(iv) The prepreg (II) was cut to create four layers when the prepreg (II) was wound onto the aforementioned laminated member such that the fiber direction was 90° with respect to the centerline of the mandrel. This prepreg was wound onto the laminated member to form the outermost layer (abrasion overlap).

After a laminated member comprising a total of 49 layers of the prepregs (I) and (II) was manufactured according to the aforementioned processes, PET tape with a width of 25 mm and thickness of 30 $\mu$m was wound at a pitch of 3 mm, from the outside of the straight layer of the outermost layer. Subsequently, the resultant product was placed into the curing oven at 190° C. for 240 minutes, and thermally cured. The weight ratio of the pitch-type carbon fiber (having an elastic modulus of 653 GPa) to the PAN-type carbon fiber (having an elastic modulus of 235 GPa) was 2.89.

After cooling, PET tape was peeled off, and the mandrel was removed. Subsequently, 30 mm was trimmed from the roll at both ends to obtain a raw roll tube with a length of 2000 mm and outer circumference of 99 mm.

The deflection was 0.317 mm upon measuring the deflection at the time a weight was placed on the roll tube according to the aforementioned measuring method. The total deflection of the aforementioned deflection plus a dead weight deflection of 0.092 mm was 0.409 mm, which was nearly equivalent to the total deflection of 0.410 mm of a steel roll shell with an equivalent roll diameter.

The raw roll tube obtained in such a manner was cut crosswise into pieces with a width of 70 mm, and the humidity and heat resistance test was performed at 150° C. for 60 hours under a saturated vapor. The outer appearance of the raw tube was favorable, and no defect such as cracking was observed.

Comparative Example 1

(1) Preparation of the Epoxy Resin Composition (Matrix Resin)

A uniform mixture of 6 parts by weight of DICY (component (E)), and 4 parts by weight of DCMU (component (E)) was added to a uniform mixture of 45 parts by weight of EP 828 (component (A)), 35 parts by weight of EP1002 (component (F)), and 30 parts by weight of N775

(component (F)), and kneaded to yield an epoxy resin composition with a rheometer viscosity of 810 poise at 60° C.

The water absorption rate of the cured resin board obtained by means of curing this epoxy resin composition after performing a humidity and heat resistance test was 5.3% by weight, and the maintenance rate of the rigidity (%) thereof 150° C. was 87%. The glass transition temperature of the cured resin board obtained by means of curing the epoxy resin composition was 140° C.

(2) Preparation of the Prepreg

The following prepregs were manufactured in the same manner as in Example 1.

Prepreg (III): Carbon fiber areal weight was 175 µm². K13710 (a pitch-type carbon fiber manufactured by Mitsubishi Chemical Corp., having an elastic modulus of 653 GPa) was used as the carbon fiber. The resin content amount was 33% by weight.

Prepreg (IV): Carbon fiber areal weight was 125 g/m². TR30S12L (a PAN-type carbon fiber manufactured by Mitsubishi Rayon Co., Ltd., having an elastic modulus of 235 GPa) was used as the carbon fiber. The resin content amount was 25% by weight.

(3) Preparation of the Roll of the Resin Reinforced With Reinforcing Fibers

The aforementioned prepregs (III) and (IV) were successively wound onto a straight mandrel with an outer circumference of 84 mm, and length of 2100 mm, according to the following processes (i)~(iii).

(i) The prepreg (IV) was cut to create four layers when the prepreg (IV) was wound onto the mandrel such that the fiber direction was 90° with respect to the centerline of the mandrel. This prepreg was wound onto the mandrel to form a 90° reinforced layer.

(ii) The prepreg (III) was cut to create eleven layers when the prepreg (I) was wound onto the 90° reinforced layer such that the fiber direction was 0° with respect to the centerline of the mandrel. This prepreg was wound onto the 90° reinforced layer to form a first straight layer.

(iii) The aforementioned winding process (ii) was further repeated twice, to obtain a laminated member comprising a total of 37 layers of the wound prepreg layers.

After a laminated member comprising a total of 37 layers of the prepregs (III) and (IV) was manufactured according to the aforementioned processes, PET tape with a width of 25 mm and thickness of 30 µm was wound at a pitch of 3 mm, from the outside of the straight layer of the outermost layer. Subsequently, the resultant product was placed into a curing oven at 190° C. for 240 minutes, and thermally cured.

After cooling, PET tape was peeled off, and mandrel was removed. Subsequently, 30 mm was trimmed from both ends of the roll to obtain a raw roll tube with a length of 2000 mm, and outer circumference of 99 mm.

The deflection was 0.360 mm upon measuring the deflection in the same manner as in Example 1. The total deflection of the aforementioned deflection plus a dead weight deflection of 0.049 mm was 0.409 mm, which was nearly equivalent to the total deflection of 0.410 mm of a steel roll shell with an equivalent roll diameter.

The raw roll tube obtained in such a manner was cut crosswise into a test piece having a width of 70 mm, and the humidity and heat resistance test was performed thereon at 150° C. for 60 hours under a saturated vapor. Welt-like cracking occurred on the inner circumference of the outer raw roll tube, in addition to slight cracking within the raw roll tube.

Example 2

(1) Preparation of the Epoxy Resin Composition (Matrix Resin)

The epoxy resin composition used in Example 1 was prepared.

(2) Preparation of the Prepreg

The aforementioned epoxy resin composition was coated onto a mold releasing paper, using a roll coater to form a resin film. Subsequently, the resin film was laid on top of a reinforced, uniaxially-oriented carbon fiber (HR40 12M manufactured by Mitsubishi Rayon Co., Ltd., with an elastic modulus of 392 GPa, and carbon fiber areal weight of 200 g/m²), and thermally treated under pressure to form a uniaxially-oriented prepreg (V) with a resin content of 24% by weight, which was impregnated with the matrix resin.

In addition, using a reinforced uniaxially-oriented carbon fiber (TR30S 12L manufactured by Mitsubishi Rayon Co., Ltd., with an elastic modulus of 235 GPa, and carbon fiber areal weight of 125 g/m²), a uniaxially-oriented prepreg (VI) with a resin content of 33% by weight was manufactured in the same manner.

(3) Preparation of the Roll of the Resin Reinforced With Reinforcing Fibers

The aforementioned prepregs (V) and (VI) were successively wound onto a straight mandrel with an outer circumference of 90 mm, and an effective winding length of 2060 mm, according to the following processes (i)~(iii).

(i) The prepreg (VI) was cut to create two layers when the prepreg (IV) was wound onto the mandrel such that the fiber direction was 90° with respect to the centerline of the mandrel. This prepreg was wound onto the mandrel to create two layers to form a first reinforcing layer.

(ii) The prepreg (III) was cut to create six layers when the prepreg (I) was wound onto the aforementioned first reinforcing layer such that the fiber direction was 0° with respect to the centerline of the mandrel. This prepreg was wound to create six layers to form a first straight layer.

(iii) The aforementioned winding processes (i) and (ii) were alternatively repeated five times each.

After completing the winding of a total of 48 layers of the wound prepreg layers comprising the prepregs (V) and (VI) according to the aforementioned processes, PET tape with a width of 25 mm and thickness of 30 µm was wound at a pitch of 3 mm, from the outside of the outermost layer (the sixth straight layer). Subsequently, the resultant product was placed into a curing oven at 190° C. for 240 minutes, and thermally cured.

The PET tape was then peeled off, and mandrel was removed. Subsequently, 30 mm was trimmed from both ends of the roll, to obtain a raw roll tube with a length of 2000 mm, and outer circumference of 106 mm.

Subsequently, the aforementioned raw roll tube was cut crosswise into test pieces with a width of 70 mm, and the humidity and heat resistance test was performed thereon at 150° C. for 60 hours under a saturated vapor. The outer appearance of the raw tube after the humidity and heat resistance was favorable, and no cracking was observed.

Comparative Example 2

(1) Preparation of the Epoxy Resin Composition (Matrix Resin)

The epoxy resin composition used in Comparative Example 1 was prepared.

(2) Preparation of the Prepreg

Two types of prepregs were manufactured, using the aforementioned epoxy resin composition, in the same manner as in Example 2.

(3) Preparation of the Roll of the Resin Reinforced With Reinforcing Fibers

A raw roll tube with a length of 2000 mm, and outer circumference of 106 mm was obtained, using the aforementioned two types of prepregs, in the same manner as in Example 2. This raw roll tube was cut crosswise into test pieces with a width of 70 mm, and the humidity and heat resistance test was performed thereon at 150° C. for 60 hours under a saturated vapor. Welt-like cracking occurred in the inner circumference of the outer raw roll tube, in addition to the cracking within the raw roll tube itself Example 3

34 parts by weight of HP-7200 (component (B)) was dissolved and mixed into a mixed resin, in which 25 parts by weight of EP 828 (component (A)), 17 parts by weight of EP 807 (component (A)), and 3 parts by weight of PVF (component (D)) had been dissolved and mixed in advance at 150° C. for 2 hours.

Subsequently, 21 parts by weight of BPF 307 (component (C)), which had been kneaded in advance using three rolls, and 22 parts by weight of DDS (component (E)) were added to the aforementioned dissolved mixture, and mixed by stirring at 50° C., using a kneader until a uniform mixture was formed, to obtain an epoxy resin composition according to the present invention. The results are shown in Table 4.

The mechanical properties, and glass transition temperature (G'-Tg) of the cured product of this epoxy resin composition, were both favorable, and the water absorption rate was low upon performing the humidity and heat resistance test on this cured product. Furthermore, the handling properties of the prepreg, obtained by means of impregnating the epoxy resin composition in a carbon fiber (TR30S 12L, manufactured by Mitsubishi Rayon Co., Ltd, having an elastic modulus of 235 GPa) such that the volume content amount of the fiber was 60% by volume, was favorable. The aforementioned epoxy resin composition was cured and molded in an autoclave to form a fiber-reinforced resin composite material with a thickness of 2 mm. After the humidity and heat resistance test (i.e., a test piece having a length of 60 mm, width of 12 mm, and thickness of 2 mm, was left at 150° C. for 60 hours under a saturated vapor), no cracking or void was observed on the cut surface of the composite material, and the humidity and heat resistance properties were favorable, showing an water absorption rate of 1.3% by weight.

Example 4

37 parts by weight of HP-7200 (component (B)), and 23 parts by weight of N 775 (component (F)) were dissolved and mixed at 120° C. for 30 minutes into a mixed resin, in which 38 parts by weight of EP 828 (component (A)), and 3 parts by weight of PVF (component (D)) had been dissolved and mixed in advance at 150° C. for 2 hours.

Subsequently, 22 parts by weight of BPF 307 (component (C)), which had been kneaded in advance using three rolls, and 35 parts by weight of DDS (component (E)) were added to the aforementioned dissolved mixture, and mixed by stirring at 50° C., using a kneader, until a uniform mixture was formed, to obtain the epoxy resin composition according to the present invention. The results are shown in Table 4.

The mechanical properties, and glass transition temperature (G'-Tg) of the cured product of this epoxy resin composition, were both favorable, and the water absorption rate was low when the humidity and heat resistance test was performed on this cured product. Furthermore, the handling properties of the prepreg, obtained by means of impregnating the epoxy resin composition, was favorable. No cracking or void was observed on the cut surface of the fiber-reinforced resin composite material, obtained by means of curing-molding the epoxy resin composition, which had undergone the humidity and heat resistance test described above.

Examples 5~12

The epoxy resin compositions comprising the components shown in Tables 1~2, were obtained in the same manner as in Example 4. The results are shown in Tables 4~5.

Comparative Examples 3~7

The epoxy resin compositions comprising the components shown in Table 3, were obtained in the same manner as in Example 3 or 4. The results are shown in Table 6.

The epoxy resin compositions according to Comparative Examples 3, 4, and 6, exhibited undesirable handling properties with respect to the prepregs, obtained by means of impregnating the epoxy resin compositions. Additionally, cracks and voids were observed on the cut surfaces of the fiber-reinforced resin composite materials obtained by means of curing-molding the epoxy resin compositions, on which the humidity and heat resistance tests had been performed.

The epoxy resin composition according to the Comparative Example 5, exhibited undesirable handling properties of the prepreg, obtained by means of impregnating the epoxy resin composition; however, no cracks or voids were observed the cut surfaces of the fiber-reinforced resin composite materials obtained by means of curing-molding the epoxy resin compositions, which had undergone the humidity and heat resistance test described above.

The epoxy resin composition according to the Comparative Example 7, exhibited favorable handling properties with respect to the prepreg, obtained by means of impregnating the epoxy resin composition; however, cracks and voids were observed on the cut surfaces of the fiber-reinforced resin composite materials obtained by means of curing-molding the epoxy resin compositions, which had undergone the humidity and heat resistance test described above.

TABLE 1

| | | Examples | | | | |
|---|---|---|---|---|---|---|
| Component | | 3 | 4 | 5 | 6 | 7 |
| (A) | EP828 | 25 | 38 | | | 38 |
| | EP807 | 17 | | 26 | 30 | |
| (B) | HP-7200 | 34 | 37 | 38 | 35 | 38 |
| (C) | BPF307 | 21 | 22 | 32 | 32 | |
| | XER91P | | | | | 22 |
| (D) | PVF | 3 | 3 | 4 | 3 | 2 |
| (E) | DDS | 22 | 35 | 35 | 33 | 35 |
| (F) | XAC4151 | | | 44 | | |
| | N-775 | | 23 | | | 22 |
| | EP1002 | | | | 41 | |

TABLE 2

| | | Examples | | | | |
|---|---|---|---|---|---|---|
| Component | | 8 | 9 | 10 | 11 | 12 |
| (A) | EP828 | | | 18 | 26 | 23 |
| | EP807 | 34 | 18 | | | |
| (B) | HP-7200 | 34 | 37 | | | |
| | HP-4032 | | | 38 | | |
| | YL6121H | | | | | 45 |
| | HPT1079 | | | | 45 | |

TABLE 2-continued

|  | Component | Examples | | | | |
|---|---|---|---|---|---|---|
|  |  | 8 | 9 | 10 | 11 | 12 |
| (C) | BPF307 |  | 23 | 32 | 28 | 28 |
|  | XER91P | 29 |  |  |  |  |
| (D) | PVF | 3 | 4 | 4 | 4 | 4 |
| (E) | DDS | 35 | 35 | 34 | 30 | 34 |
| (F) | XAC4151 | 37 |  | 8 | 17 | 12 |
|  | XAC4152 |  | 37 |  |  |  |

TABLE 3

|  | Component | Comparative Examples | | | | |
|---|---|---|---|---|---|---|
|  |  | 3 | 4 | 5 | 6 | 7 |
| (A) | EP828 |  |  | 15 |  |  |
|  | EP807 | 75 | 53 | 19 | 100 | 93 |
| (B) | HP-7200 | 15 | 37 | 36 |  |  |
| (C) | BPF307 | 10 | 10 | 24 |  |  |
| (D) | PVF |  |  | 6 |  | 7 |
| (E) | DDS | 35 | 35 | 35 |  |  |
|  | DICY |  |  |  | 10 | 8 |
|  | DCMU |  |  |  | 5 | 5 |
| (F) | XAC4151 |  | 20 | 48 |  |  |
|  | N-775 |  |  |  | 40 | 30 |
|  | EP1002 |  |  |  | 11 | 11 |

TABLE 4

|  |  | Examples | | | | |
|---|---|---|---|---|---|---|
|  |  | 3 | 4 | 5 | 6 | 7 |
| Viscosity of the composition (poise) | | 1505 | 2917 | 550 | 2398 | 2900 |
| Handling properties of the prepreg | | ○ | ○ | ○ | ○ | ○ |
| G'-Tg (° C.) | | 161 | 165 | 160 | 162 | 160 |
| Water absorption rate of the cured composition (%) | | 3.2 | 3.3 | 3.4 | 3.4 | 3.3 |
| Bending test | Strength (MPa) | 145 | 143 | 145 | 144 | 139 |
|  | Elastic modulus (GPa) | 2.95 | 2.92 | 2.94 | 2.90 | 2.89 |
|  | Elongation (%) | 12 | 12 | 12 | 12 | 12 |
| CFRP properties | Water absorption rate (%) | 1.2 | 1.1 | 1.1 | 1.2 | 1.1 |
|  | Cut surface | ○ | ○ | ○ | ○ | ○ |
| Log G' after/Log G' before | | 0.99 | 0.97 | 0.98 | 0.97 | 0.97 |

TABLE 5

|  |  | Examples | | | | |
|---|---|---|---|---|---|---|
|  |  | 8 | 9 | 10 | 11 | 12 |
| Viscosity of the composition (poise) | | 2700 | 800 | 1850 | 2050 | 1520 |
| Handling properties of the prepreg | | ○ | ○ | ○ | ○ | ○ |
| G'-Tg (° C.) | | 162 | 167 | 185 | 190 | 160 |
| Water absorption rate of the cured composition (%) | | 3.3 | 3.3 | 3.0 | 3.2 | 3.2 |
| Bending test | Strength (MPa) | 138 | 142 | 151 | 156 | 152 |
|  | Elastic modulus (GPa) | 2.94 | 2.91 | 3.02 | 3.04 | 2.99 |
|  | Elongation (%) | 11 | 12 | 10 | 10 | 8 |
| CFRP properties | Water absorption rate (%) | 1.1 | 1.2 | 1.0 | 1.0 | 1.0 |
|  | Cut surface | ○ | ○ | ○ | ○ | ○ |
| Log G' after/Log G' before | | 0.98 | 0.98 | 0.98 | 0.99 | 0.99 |

TABLE 6

|  |  | Comparative Examples | | | | |
|---|---|---|---|---|---|---|
|  |  | 3 | 4 | 5 | 6 | 7 |
| Viscosity of the composition (poise) | | 105 | 240 | 4500 | 350 | 1850 |
| Handling properties of the prepreg | | X | X | X | X | ○ |
| G'-Tg (° C.) | | 155 | 160 | 164 | 135 | 130 |
| Water absorption rate of the cured composition (%) | | 3.3 | 3.3 | 3.4 | 5.3 | 5.4 |
| Bending test | Strength (MPa) | 147 | 147 | 147 | 147 | 147 |
|  | Elastic modulus (GPa) | 2.97 | 2.99 | 2.99 | 3.02 | 3.05 |
|  | Elongation (%) | 12 | 12 | 9 | 11 | 11 |
| CFRP properties | Water absorption rate (%) | 1.3 | 1.2 | 1.1 | 5.2 | 5.3 |
|  | Cut surface | X | X | ○ | X | X |
| Log G' after/Log G' before | | 0.87 | 0.87 | 0.96 | 0.85 | 0.84 |

Industrial Applicability

As described in the aforementioned, the epoxy resin composition according to the present invention satisfies the aforementioned specific conditions, and thus is able to exhibit superior humidity and heat resistance properties when cured.

In addition, the epoxy resin composition according to the present invention comprises the aforementioned specific compositions, and thus can provide a cured product which exhibits superior humidity and heat resistance properties, and a prepreg which exhibits adequate tacking properties, in addition to favorable handling and molding properties when cured and molded.

Additionally, the prepreg according to the present invention comprises an epoxy resin composition according to the present invention, and reinforcing fibers, and thus is able to exhibit adequate tacking properties, favorable handling and molding properties, and superior humidity and heat resistance properties when cured and molded.

In addition, the roll of the resin reinforced with reinforcing fibers according to the present invention is obtained by means of laminating a plurality of layers of a resin reinforced with reinforcing fibers comprising reinforcing fibers and a matrix resin comprising a resin composition that satisfies the aforementioned particular conditions. Consequently, such a roll of a resin reinforced with reinforcing fibers can be resistant to severe high temperature, high humidity conditions, such as those encountered under the vulcanizing conditions for forming a rubber-coated layer.

In addition, the roll of the resin reinforced with reinforcing fibers according to the present invention is obtained by means of laminating at least one layer (I) of a resin reinforced with reinforcing fibers comprising long reinforcing fibers having an elastic modulus of 600~800 GPa, and a resin composition; at least one layer (II) of a resin reinforced with reinforcing fibers comprising long reinforcing fibers having an elastic modulus of 140–300 GPa, and a resin composition for supporting said roll of a resin reinforced with reinforcing fibers in a circumferential direction; wherein, the weight ratio of said long reinforcing fibers having an elastic modulus of 600–800 GPa to said long reinforcing fibers having an elastic modulus of 140–300 GPa is 2/3–4/1. Thus, the roll of a resin reinforced with reinforcing fibers according to the present invention possesses a rigidity equivalent to that of a steel roll.

In addition, if the aforementioned resin composition satisfies the aforementioned particular conditions, it is possible to provide a roll of a resin reinforced with reinforcing fibers that possesses a rigidity equivalent to that of a steel roll, and is resistant to severe high temperature, high humidity conditions such as those encountered under the vulcanizing conditions for forming a rubber-coated layer.

The roll of a resin reinforced with reinforcing fibers according to the present invention exhibits sufficient humidity and heat resistance properties even when exposed to severe high temperature, high humidity conditions, such as under the vulcanizing conditions for forming a rubber-coated layer. These properties can be sufficiently utilized, in particular, when a rubber-coating layer is provided, such as in the case of an ink roll or nip roll for a rotary press for newspapers.

In addition to the ink roll and nip roll for a rotary press for newspapers, the roll of a resin reinforced with reinforcing fibers according to the present invention may be applied to various tubular products such as fishing rods, golf club shafts, and the like.

What is claimed is:

1. An epoxy resin composition having a water absorption rate of no greater than 3.5% by weight, wherein the water absorption rate is the water absorption rate of a resin board cured at 180° C. for three hours to form a cured resin board of 2 mm thickness then cut into a 60 mm×12 mm×2 mm test piece and exposed to a saturated vapor at 150° C. for 60 hours.

2. The epoxy resin composition according to claim 1, further satisfying the following condition (b):

(b) the test piece has a rigidity as measured by a ratio (LogG' after)/(LogG' before) of not less than 0.95, wherein (LogG' after) is the rigidity of the test piece at 150° C. after sitting for 60 hours under a saturated vapor at 150° C. and (LogG' before) is the rigidity of the test piece at 150° C. prior to sitting for 60 hours under a saturated vapor at 150° C.

3. The epoxy resin composition according to claim 1, further satisfying the following condition (c):

(c) a glass transition temperature of the test piece is 150–200° C.

4. A prepreg, comprising:
an epoxy resin composition according to claim 1; and reinforcing fibers.

5. A An epoxy resin composition, comprising:
a resin component (X) comprising
   20 to 59% by weight of a bisphenol epoxy resin (A) which is in an aqueous state at room temperature;
   25 to 50% by weight of an epoxy resin (B) comprising at least one repeating unit selected from the group consisting of the following formulae 1–4

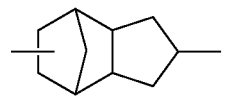 (formula 1)

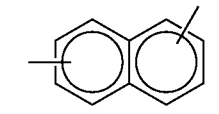 (formula 2)

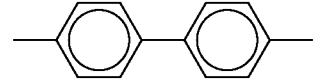 (formula 3)

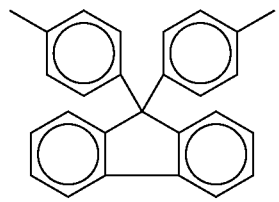 (formula 4)

15 to 40% by weight of an epoxy resin (C) modified by crosslinked rubber granules having an average diameter of no greater than 1 μm; and
   1 to 10% by weight of a thermoplastic resin (D) that is soluble in a mixture of said epoxy resin (A) and said epoxy resin (B); and
a diamino diphenylsulfone (E) in the amount of 20 to 50 parts by weight based on 100 parts by weight of said resin component (X);
wherein a viscosity of said epoxy resin composition at 60° C. is 500 to 3000 poise.

6. The epoxy resin composition according to claim 5, further comprising:
   5 to 50 parts by weight of an epoxy resin (F) which is different from said epoxy resin (B) and has a softening point of at least 70° C., wherein parts by weight is based on 100 parts by weight of said resin component (X).

7. A cylindrical or tubular roll of a resin reinforced with reinforcing fibers, formed by laminating a plurality of layers of resins reinforced with reinforcing fibers, said cylindrical or tubular roll of a resin comprising:
reinforcing fibers; and
a matrix resin;
wherein said matrix resin comprises an epoxy resin composition having a water absorption rate of no greater than 3.5% by weight,
wherein the water absorption rate is the water absorption rate of a resin board cured at 180° C. for three hours to form a cured resin board of 2 mm thickness then cut into a 60 mm×12 mm×2 mm test piece and exposed to a saturated vapor at 150° C. for 60 hours.

8. The cylindrical or tubular roll of a resin reinforced with reinforcing fibers according to claim 7, wherein said epoxy resin composition satisfies the following condition (b):

(b) a cured board of 60 mm×12 mm×2 mm has a ratio (LogG' after)/(LogG' before) of not less than 0.95, wherein (LogG' after) at 150° C. is the rigidity of said cured resin board after sitting for 60 hours under a saturated vapor at 150° C. and (LogG' before) is the rigidity at 150° C. of said cured resin board before sitting for 60 hours under a saturated vapor at 150° C.

9. The cylindrical or tubular roll of a resin reinforced with reinforcing fibers according to claim 7, wherein said epoxy resin composition satisfies the following condition (c):
   (c) a glass transition temperature of the test piece is 150–200° C.

10. A cylindrical or tubular roll of a resin reinforced with reinforcing fibers, formed by laminating a plurality of layers of resins reinforced with reinforcing fibers, said cylindrical or tubular roll of a resin comprising:
   reinforcing fibers; and a matrix resin;
   wherein said matrix resin comprises an epoxy resin composition comprising
      a resin component (X) comprising
         20 to 59% by weight of a bisphenol epoxy resin (A) which is in an aqueous state at room temperature;
         25 to 50% by weight of an epoxy resin (B) comprising at least one repeating unit selected from the group consisting of the following formulae 1–4

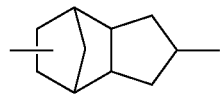
(formula 1)

(formula 2)

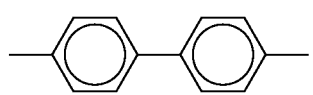
(formula 3)

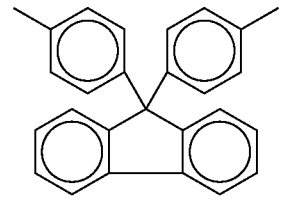
(formula 4)

15 to 40% by weight of an epoxy resin (C) modified by crosslinked rubber granules having an average diameter of no greater than 1 µm; and
   1 to 10% by weight of a thermoplastic resin (D) that is soluble in a mixture of said epoxy resin (A) and said epoxy resin (B); and
   a diamino diphenylsulfone (E) in the amount of 20 to 50 parts by weight based on 100 parts by weight of said resin component (X);
   wherein a viscosity of said epoxy resin composition at 60° C. is 500 to 3000 poise.

11. The cylindrical or tubular roll of a resin reinforced with reinforcing fibers according to claim 10, wherein said epoxy resin composition further comprises
   5 to 50 parts by weight of an epoxy resin (F) which is different from said epoxy resin (B) and has a softening point of least 70° C., wherein parts by weight is based on 100 parts by weight of said resin component (X).

12. A cylindrical or tubular roll of a resin reinforced with reinforcing fibers, comprising:
   at least one layer (I) of a resin reinforced with reinforcing fibers comprising long reinforcing fibers having an elastic modulus of 600 to 800 GPa, and an epoxy resin composition;
   at least one layer (II) of a resin reinforced with reinforcing fibers comprising long reinforcing fibers having an elastic modulus of 140 to 300 GPa, and an epoxy resin composition for supporting said roll of a resin reinforced with reinforcing fibers in a circumferential direction;
   wherein a weight ratio of said long reinforcing fibers having an elastic modulus of 600 to 800 GPa to said long reinforcing fibers having an elastic modulus of 140 to 300 GPa is 2/3 to 4/1.

13. The cylindrical or tubular roll of a resin reinforced with reinforcing fibers according to claim 12, wherein said epoxy resin composition has a water absorption rate of no greater than 3.5% by weight,
   wherein the water absorption rate is the water absorption rate of a resin board cured at 180° C. for three hours to form a cured resin board of 2 mm thickness then cut into a 60 mm×12 mm×2 mm test piece and exposed to a saturated vapor at 150° C. for 60 hours.

14. The cylindrical or tubular roll of a resin reinforced with reinforcing fibers according to claim 12, wherein said epoxy resin composition satisfies the following condition (b):
   (b) a cured board of 60 mm×12 mm×2 mm has a ratio (LogG' after)/(LogG' before) of not less than 0.95, wherein (LogG' after) is the rigidity at 150° C. of said cured resin board after sitting for 60 hours under a saturated vapor at 150° C. and (LogG' before) is the rigidity at 150° C. of said cured resin board before sitting for 60 hours under a saturated vapor at 150° C.

15. The cylindrical or tubular roll of a resin reinforced with reinforcing fibers according to claim 12, wherein said epoxy resin composition satisfies the following condition (c):
   (c) a glass transition temperature of the cured resin board obtained by means of curing said resin composition is 150–200° C.

16. The cylindrical or tubular roll of a resin reinforced with reinforcing fibers according to claim 12, wherein said epoxy resin composition comprises:
   a resin component (X) comprising
      20 to 59% by weight of a bisphenol epoxy resin (A) which is in an aqueous state at room temperature;
      25 to 50% by weight of an epoxy resin (B) comprising at least one repeating unit selected from the group consisting of the following formulae 1–4

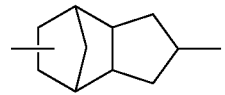
(formula 1)

(formula 2)

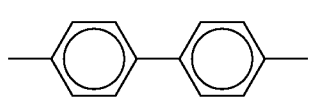
(formula 3)

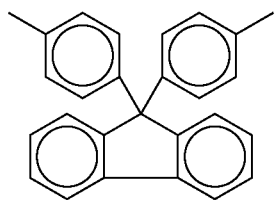

(formula 4)

15 to 40% by weight of an epoxy resin (C) modified by crosslinked rubber granules having an average diameter of no greater than 1 μm; and 1 to 10% by weight of a thermoplastic resin (D) that is soluble in a mixture of said epoxy resin (A) and said epoxy resin (B); and a diamino diphenylsulfone (E) in the amount of 20 to 50 parts by weight based on 100 parts by weight of said resin component (X);

wherein a viscosity of said epoxy resin composition at 60° C. is 500 to 3000 poise.

17. The cylindrical or tubular roll of a resin reinforced with reinforcing fibers according to claim 16, wherein said epoxy resin composition further comprises 5 to 50 parts by weight of an epoxy resin (F) which is different from said epoxy resin (B) and has a softening point of least 70° C., wherein parts by weight is based on 100 parts by weight of said resin component (X).

* * * * *